(12) United States Patent
Demura et al.

(10) Patent No.: US 7,343,900 B2
(45) Date of Patent: Mar. 18, 2008

(54) IGNITION TIMING CONTROLLER OF INTERNAL COMBUSTION ENGINE

(75) Inventors: Takayuki Demura, Mishima (JP); Tetsuji Nagata, Kariya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 41 days.

(21) Appl. No.: 10/566,591

(22) PCT Filed: Apr. 21, 2005

(86) PCT No.: PCT/JP2005/008088

§ 371 (c)(1), (2), (4) Date: Jan. 31, 2006

(87) PCT Pub. No.: WO2005/103483

PCT Pub. Date: Nov. 3, 2005

(65) Prior Publication Data

US 2006/0243249 A1    Nov. 2, 2006

(30) Foreign Application Priority Data

Apr. 22, 2004    (JP) .............................. 2004-127201

(51) Int. Cl.
  *F02D 43/00*    (2006.01)
(52) U.S. Cl. .............................. 123/406.47; 123/406.15
(58) Field of Classification Search ........... 123/406.15, 123/406.47; 701/111
See application file for complete search history.

(56) References Cited

U.S. PATENT DOCUMENTS 5,267,164 A * 11/1993 Miyama ..................... 701/111
6,877,482 B2 * 4/2005 Kinose ................... 123/406.29
6,947,828 B2 * 9/2005 Fujiwara et al. ............. 701/111
7,134,420 B2 * 11/2006 Miyashita ................... 123/299
7,159,565 B2 * 1/2007 Demura et al. ......... 123/406.47

FOREIGN PATENT DOCUMENTS

| JP | A 7-180643 | 7/1995 |
| JP | A 2000-73924 | 3/2000 |
| JP | A 2001-12286 | 1/2001 |
| JP | A 2001-20837 | 1/2001 |
| JP | A 2002-70558 | 3/2002 |

\* cited by examiner

*Primary Examiner*—Willis R. Wolfe
*Assistant Examiner*—Johnny H. Hoang
(74) *Attorney, Agent, or Firm*—Oliff & Berridge, PLC (57) ABSTRACT

To provide an ignition timing controller of an internal combustion engine which prevents poor acceleration due to overcorrection for retard and the occurrence of knocking due to undercorrection for retard regardless of a change in the ratio of fuel injections, the internal combustion engine with an injector (11) for in-cylinder injection and an injector (12) for intake passage injection includes a transitional retard control section for correcting ignition timing for retard to prevent knocking during transitional operation of the engine, wherein a control amount by the transitional retard control section depends on a ratio of an amount of fuel injection from the injector (11) for in-cylinder injection to an amount of fuel injection from the injector (12) for intake passage injection.

4 Claims, 10 Drawing Sheets

IGNITION TIMING CONTROLLER OF INTERNAL COMBUSTION ENGINE

TECHNICAL FIELD

The present invention relates to an ignition timing controller of an internal combustion engine, and more particularly, to an ignition timing controller of an internal combustion engine which includes an injector for in-cylinder injection which injects fuel into a cylinder and an injector for intake passage injection which injects fuel into an intake passage or an intake port.

BACKGROUND ART

Generally, a so-called dual injection type internal combustion engine is known which includes an injector for in-cylinder injection which injects fuel into a cylinder and an injector for intake passage injection which injects fuel into an intake passage or an intake port and switches between them for use depending on the operational state of the engine to realize, for example, stratified charge combustion in a low-load operational region and homogeneous charge combustion in an intermediate/high-load operational region such that the ratio of fuel injections from both injectors is appropriately changed in accordance with the operational state in the homogeneous charge combustion region. For example, see Patent Document 1.

In addition, Patent Document 2, for example, describes a technique in which when ignition timing is corrected for retard in order to prevent knocking produced in transition such as during acceleration, that is, transitional knocking, the retard correction of the ignition timing is performed by taking account of influences of the temperature of cooling water or the temperature of intake air.

In the technique described in Patent Document 2 mentioned above, the retard correction of the ignition timing is performed in consideration of influences of the cooling water temperature or the intake air temperature, and this is effective for an engine which includes only an injector for intake passage injection. However, this technique is not effective if it is applied without any change to a dual injection type internal combustion engine which includes an injector for in-cylinder injection and an injector for intake passage injection such that the ratio of fuel injections from both injectors is changed depending on the operational state. This is because a change in the ratio of fuel injections from the injector for in-cylinder injection and the injector for intake passage injection leads to a change of the temperature of intake air in the cylinder, that is, the in-cylinder intake air temperature to change the conditions under which the transitional knocking occurs, thereby presenting problems such as poor acceleration due to the overcorrection for retard and the occurrence of knocking due to undercorrection for retard.

(Patent Document 1) Japanese Patent Application Laid-Open No. 2001-20837

(Patent Document 2) Japanese Patent Application Laid-Open No. 7-180643 (1995)

DISCLOSURE OF THE INVENTION

Accordingly, it is an object of the present invention to provide an ignition timing controller of an internal combustion engine resolving the abovementioned problems to prevent poor acceleration due to overcorrection for retard and the occurrence of knocking due to undercorrection for retard regardless of a change in the ratio of fuel injections.

According to one aspect of the present invention for achieving the abovementioned object, an ignition timing controller of an internal combustion engine with an injector for in-cylinder injection and an injector for intake passage injection comprises a transitional retard control means for correcting ignition timing for retard to prevent knocking during transitional operation of the engine, wherein a control amount by the transitional retard control means depends on a ratio of an amount of fuel injection from the injector for in-cylinder injection to an amount of fuel injection from the injector for intake passage injection.

The control amount by the transitional retard control means may be an initial value of a retard correction amount.

The control amount by the transitional retard control means may be an attenuation rate of a retard correction amount.

According to another aspect of the present invention for achieving the abovementioned object, an ignition timing controller of an internal combustion engine with an injector for in-cylinder injection and an injector for intake passage injection comprises a transitional retard control means for correcting ignition timing for retard to prevent knocking during transitional operation of the engine, wherein a condition for performing control by the transitional retard control means depends on a ratio of an amount of fuel injection from the injector for in-cylinder injection to an amount of fuel injection from the injector for intake passage injection.

According to the ignition timing controller of the internal combustion engine according to the one aspect of the present invention, in the internal combustion engine which comprises the injector for in-cylinder injection and the injector for intake passage injection, the control amount of retard correction of ignition timing by the transitional retard control means can depend on the ratio of the amount of fuel injection from the injector for in-cylinder injection to the amount of fuel injection from the injector for intake passage injection during the transitional operation of the engine, so that the retard correction of ignition timing is performed without overcorrection or undercorrection. Thus, the occurrence of transitional knocking can be appropriately reduced.

According to the aspect in which the control amount by the transitional retard control means is the initial value of the retard correction amount, the occurrence of transitional knocking can be appropriately reduced.

According to the aspect in which the control amount by the transitional retard control means is the attenuation rate of the retard correction amount, poor acceleration after the completion of retard control can be avoided.

According to the ignition timing controller of the internal combustion engine according to the other aspect of the present invention, in the internal combustion engine which comprises the injector for in-cylinder injection and the injector for intake passage injection, the condition for performing retard correction control of ignition timing by the transitional retard control means can depend on the ratio of the amount of fuel injection from the injector for in-cylinder injection to the amount of fuel injection from the injector for intake passage injection during the transitional operation of the engine, so that the retard correction of ignition timing is performed properly. Thus, the occurrence of transitional knocking can be appropriately reduced.

BEST MODE FOR CARRYING OUT THE INVENTION

Embodiments of the present invention will hereinafter be described with reference to the drawings.

Figure 1:
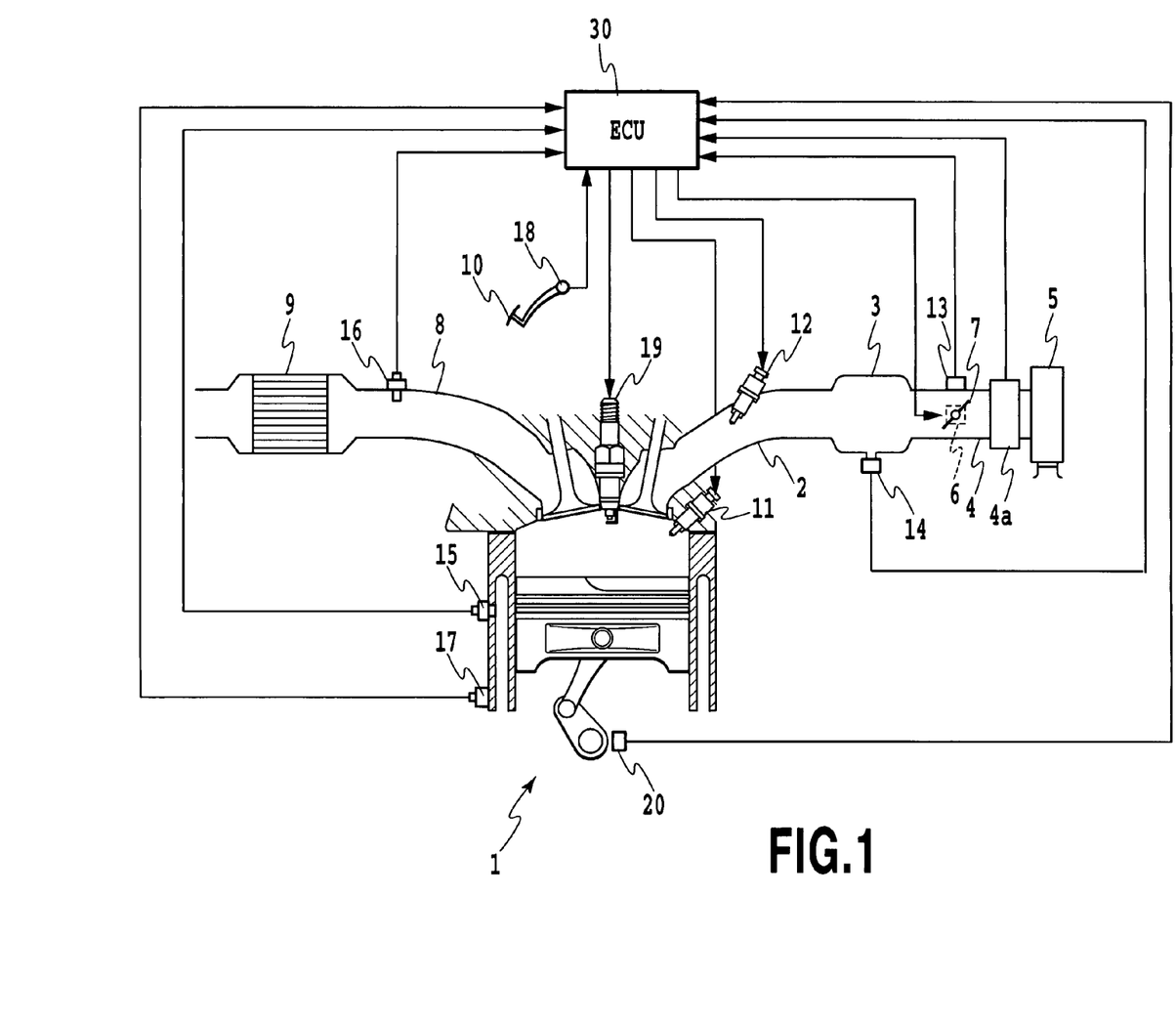
FIG. 1 is a schematic diagram showing the general structure of an ignition timing controller of an internal combustion engine according to the present invention.

Referring first to FIG. 1 which illustrates the general structure of an ignition timing controller of a dual injection type internal combustion engine according to the present invention, an engine 1 includes a plurality of cylinders and the respective cylinders are connected to a common surge tank 3 through associated intake manifold 2. The surge tank 3 is connected to an air flow meter 4a through an intake duct 4, and the air flow meter 4a is connected to an air cleaner 5. A throttle valve 7, which is driven by a step motor 6, is disposed in the intake duct 4. On the other hand, the respective cylinders are coupled to a common exhaust manifold 8, and the exhaust manifold 8 is coupled to a three-way catalytic converter 9.

To each cylinder, an injector 11 for in-cylinder injection which injects fuel into the cylinder and an injector 12 for intake passage injection which injects fuel into an intake port or an intake passage are attached. These injectors 11 and 12 are controlled on the basis of output signals from an electronic control unit (ECU) 30. In addition, each injector 11 for in-cylinder injection is connected to a common fuel distribution pipe (not shown), and the fuel distribution pipe is connected to a high-pressure fuel pump of an engine-driven type through a one-way valve. A discharge side of the high-pressure fuel pump is coupled to an inlet side of the high-pressure fuel pump through an electromagnetic spill valve such that the fuel amount supplied from the high-pressure fuel pump into the fuel distribution pipe is increased as the opening of the electromagnetic spill valve is smaller, and the fuel supply from the high-pressure fuel pump to the fuel distribution pipe is stopped when the electromagnetic spill valve is fully opened. The electromagnetic spill valve is controlled on the basis of an output signal from the electronic control unit 30.

On the other hand, each injector 12 for intake passage injection is also connected to a common fuel distribution pipe (not shown). The fuel distribution pipe and the high-pressure fuel pump are connected to a low-pressure fuel pump of an electric motor-driven type through a common fuel pressure regulator. The low-pressure fuel pump is further connected to a fuel tank through a fuel filter.

The electronic control unit 30 is realized by a digital computer and is provided with ROM (Read Only Memory), RAM (Random Access Memory), CPU (microprocessor), input ports, output ports and the like which are interconnected through bidirectional buses. The air flow meter 4a generates an output voltage in proportion to the amount of intake air, and the output voltage from the air flow meter 4a is input to the input port through an AD converter. Similarly, a throttle opening sensor 13 is provided for generating an output voltage in proportion to the opening of the throttle valve 7, an intake pressure sensor 14 is provided for generating an output voltage in proportion to the intake pressure of the surge tank 3, and a water temperature sensor 15 is provided for generating an output voltage in proportion to the temperature of engine cooling water. The output voltages from them are input to the respective input ports through the AD converters.

In addition, an air-fuel ratio sensor 16 for generating an output voltage in proportion to the concentration of oxygen in the exhaust gas is attached to the exhaust manifold 8 upstream of the catalyst 9, a knocking sensor 17 for generating an output voltage in proportion to the vibration of an engine block is attached to the engine block, and an accelerator opening sensor 18 for generating an output voltage in proportion to the amount of depressing of an accelerator pedal 10 is attached to the accelerator pedal 10. The output voltages from the air-fuel ratio sensor 16, the knocking sensor 17, and the accelerator opening sensor 18 are similarly input to the respective input ports through the AD converters.

A crank angle sensor 20 for generating an output pulse for each unit crank angle is connected to the input port. An engine speed is determined by measuring the number of occurrence of output pulses from the crank angle sensor 20 per unit time. Thus, the crank angle sensor 20 may hereinafter be referred to as a rotation speed sensor. The ROM of the electronic control unit 30 stores previously mapped values of fuel injection amounts, the injection ratios, the ignition timings and the retard correction values set in association with the engine operational state, correction values based on the engine cooling water temperature and the like, based on the parameters of the engine load factor and the engine speed obtained from the intake pressure sensor 14 or the accelerator opening sensor 18 and the crank angle sensor 20 described above.

The output ports of the electronic control unit 30 are connected to the step motor 6, each injector 11 for in-cylinder injection, each injector 12 for intake passage injection, an ignition plug 19 and the like through associated driving circuits.

Next, description will hereinafter be made of the control in Embodiment 1 of the ignition timing controller of the dual injection type internal combustion engine according to the present invention having the abovementioned structure with reference to a flow chart shown in FIG. 2. The electronic control unit 30 acquires the abovementioned various operational state parameters and the knocking determination result, as well as the engine speed, the vehicle speed, and the crank angle data, and in addition, parameters such as a signal of an idle switch (not shown), to perform computation and processing for fuel injection control and ignition timing control necessary for the operation of the engine, thereby controlling the injector 11 for in-cylinder injection and the injector 12 for intake passage injection and also controlling the ignition plug 19 through an ignition driving circuit based upon the result.

Figure 2:
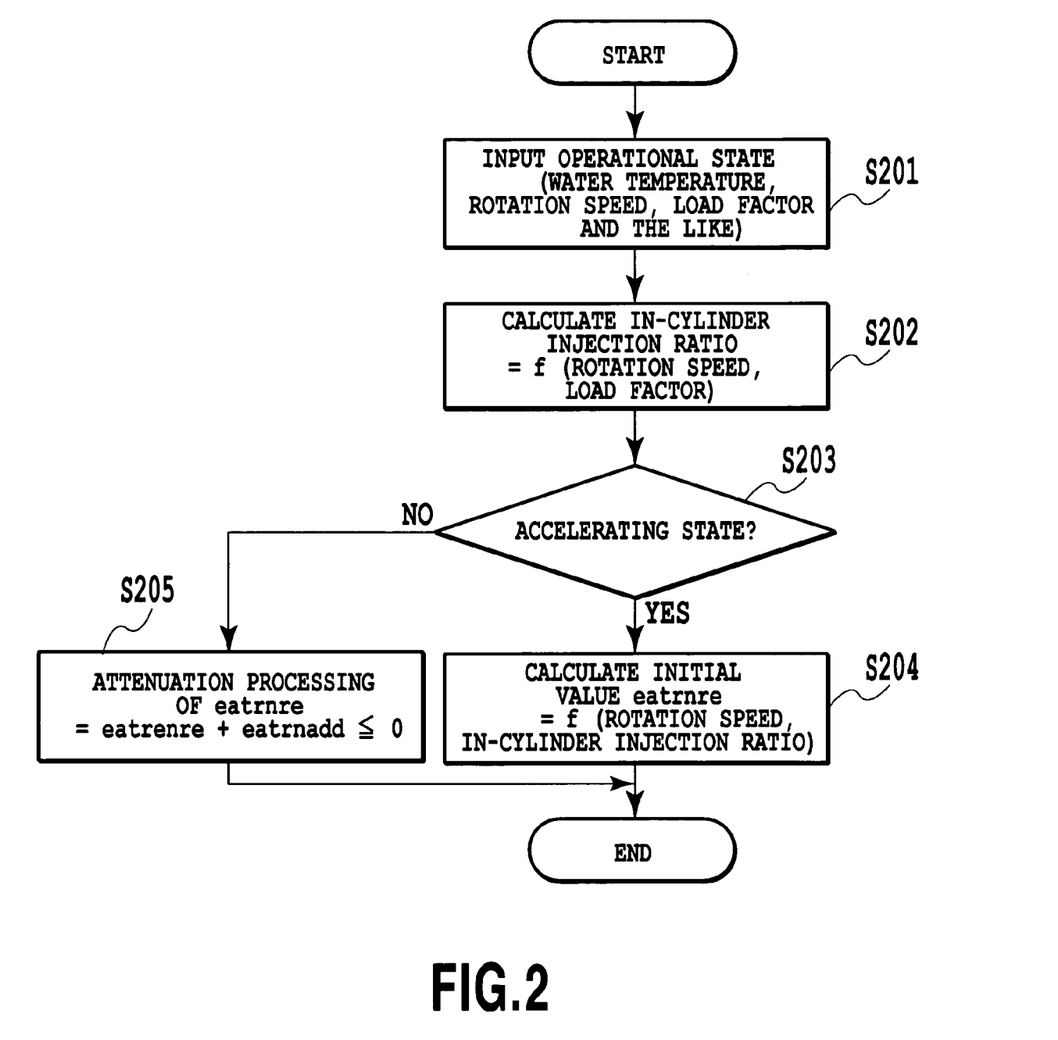
FIG. 2 is a flow chart showing an example of a transitional retard control routine in Embodiment 1 of the present invention.

FIG. 2 shows the flow chart which illustrates an example of a control routine for the ignition timing controller according to the present invention. The control routine is performed for each predetermined crank angle, for example, 180 degrees (in the case of a four-cylinder engine). In the routine, at step S201, the cooling water temperature, the engine speed, the load factor and the like which are various operational state parameters of the engine are acquired. The routine proceeds to step S202, wherein the fuel injection amounts and the corresponding injection ratio from the map values stored in the ROM based on the engine speed and the load factor are calculated.

Figure 3:
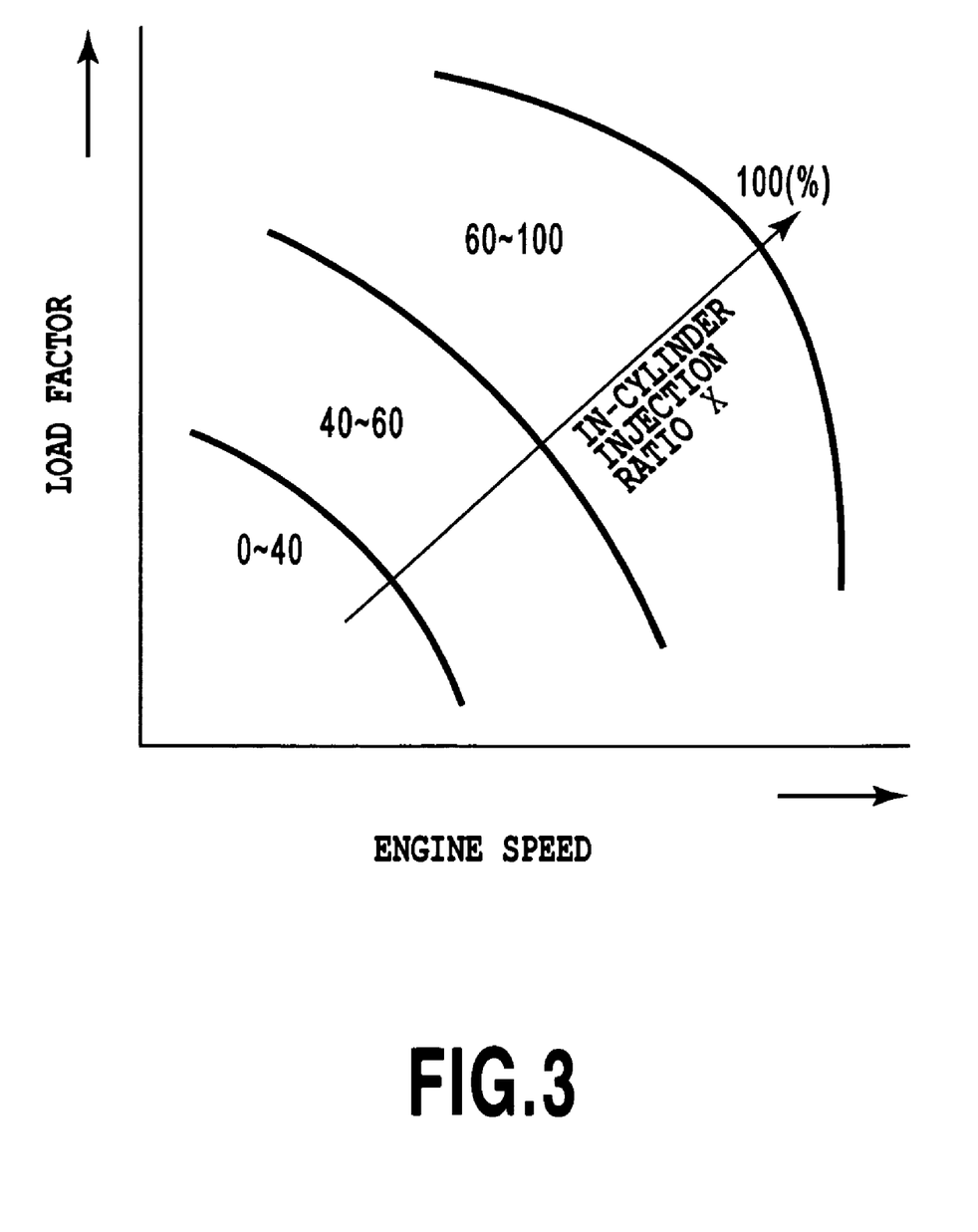
FIG. 3 is a graph showing an example of a ratio of injections from an injector for in-cylinder injection and an injector for intake passage injection in the engine to which the present invention is applied.

FIG. 3 shows an example of the injection ratio between the injector 11 for in-cylinder injection and the injector 12 for intake passage injection in the engine 1 to which the present invention is applied. In this case, the ratio of injection from the injector 11 for in-cylinder injection to the total fuel injection amount is represented as X, and accordingly, the ratio of injection from the injector 12 for intake passage injection is represented as (1-X) in this case.

At step S203, it is determined whether or not the engine is in an accelerating state in which transitional knocking easily occurs. In the determination at step S203, for example, the current intake pressure PM (absolute value) is determined, and when the PM is equal to or higher than a predetermined value (for example, 320 mmHg), it is determined that the intake air amount is large and the engine is in the state in which the knocking easily occurs. In addition, the previous PM value ($PM_{i-1}$) is compared with the current PM value ($PM_i$), and if the difference ($PM_{i-1}-PM_i$) is larger than a certain value (for example, 80 mmHg), it is determined that the PM is quickly increased and the engine is in the accelerating state, and the routine proceeds to step S204. On the other hand, when the intake pressure PM is lower than the predetermined value or higher than the predetermined value but not in the accelerating state, the routine proceeds to step S205 to be later described.

Figure 6:
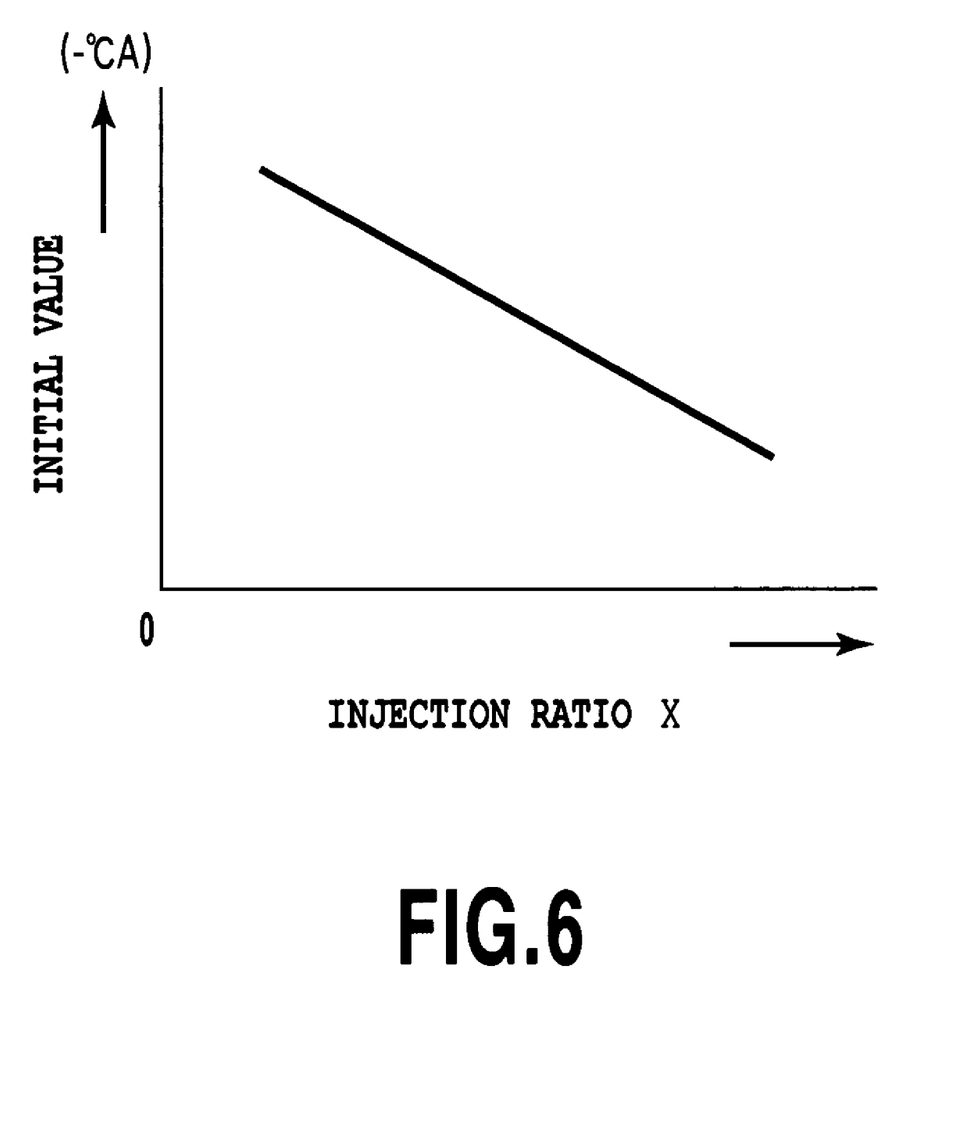
FIG. 6 is a graph showing an example of a relationship between an injection ratio and an initial value in an embodiment of the present invention.

At step S204, an initial value "eatrnre" (a negative value represented by a crank angle) of a transitional ignition retard correction amount "ATRN" is determined from the map values based on the injection ratio determined at step S202 and the rotation speed of the engine or calculated through computation. The initial value "eatrnre" is set to be smaller as the injection ratio X from the injector 11 for in-cylinder injection is larger, as an example shown in FIG. 6. This is because, when the injection ratio X from the injector 11 for in-cylinder injection is large, the fuel injection amount into the cylinder is increased to remove more latent heat of vaporization, so that the temperature within the cylinder is lowered by the corresponding amount and the transitional knocking does not occur easily.

When it is determined in the determination at step S203 that the engine is no longer in the abovementioned accelerating state, the routine proceeds to step S205, wherein attenuation processing on the initial value "eatrnre" of the transitional ignition retard correction amount "ATRN" is performed. The attenuation processing is performed in the present embodiment by adding a certain attenuation amount "eatrnadd" (a positive value represented by a crank angle) to the initial value "eatrnre" for each cycle of the control routine. Thus, after a predetermined control routine cycle, in other words, after the lapse of a predetermined time period, the transitional ignition retard correction amount "ATRN" is equal to zero. The attenuation processing in step S205 is guarded to avoid the resultant value equal to or lower than zero in order to prevent excessive attenuation processing in a routine cycle in a steady state which is not an accelerating state.

Figure 8:
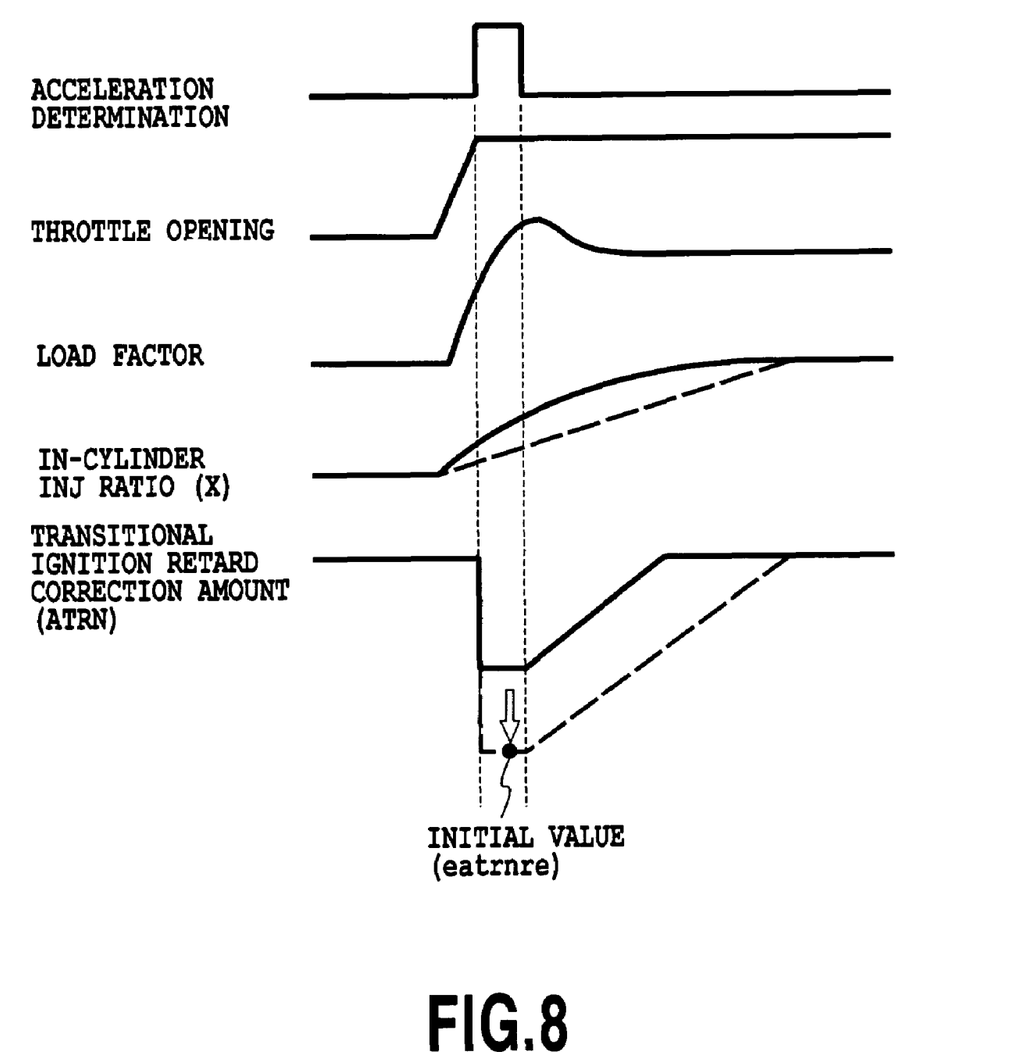
FIG. 8 is a time chart showing states of transitional retard control in Embodiment 1 of the present invention.

For easier understanding, states of control in Embodiment 1 described above are shown in a time chart of FIG. 8. In the time chart, changing states in the initial value "eatrnre" are represented in different manners with a solid line and a broken line in association with the injection ratio X (represented as in-cylinder INJ ratio in FIG. 8) from the injector 11 for in-cylinder injection.

Next, description will hereinafter be made of control in Embodiment 2 of the ignition timing controller of the dual injection type internal combustion engine according to the present invention with reference to a flow chart shown in FIG. 4. The control in Embodiment 2 differs from the abovementioned control in Embodiment 1 only in that the initial value "eatrnre" of the transitional ignition retard correction amount "ATRN" is changed in association with the injection ratio X in the former, while an attenuation rate in attenuation processing is also changed in association with the injection ratio X in the latter. Thus, that difference will be mainly described.

Figure 4:
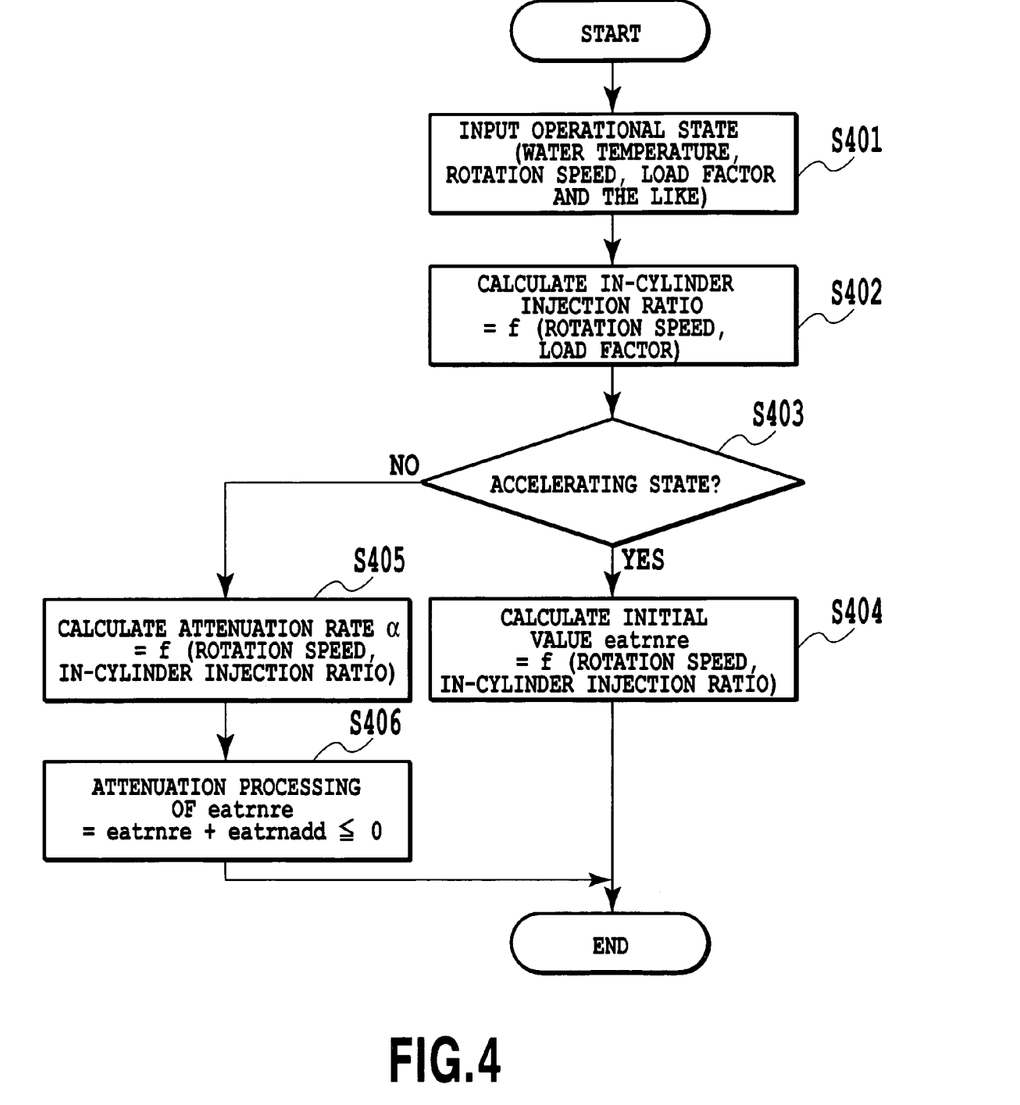
FIG. 4 is a flow chart showing an example of a transitional retard control routine in Embodiment 2 of the present invention.
Figure 7:
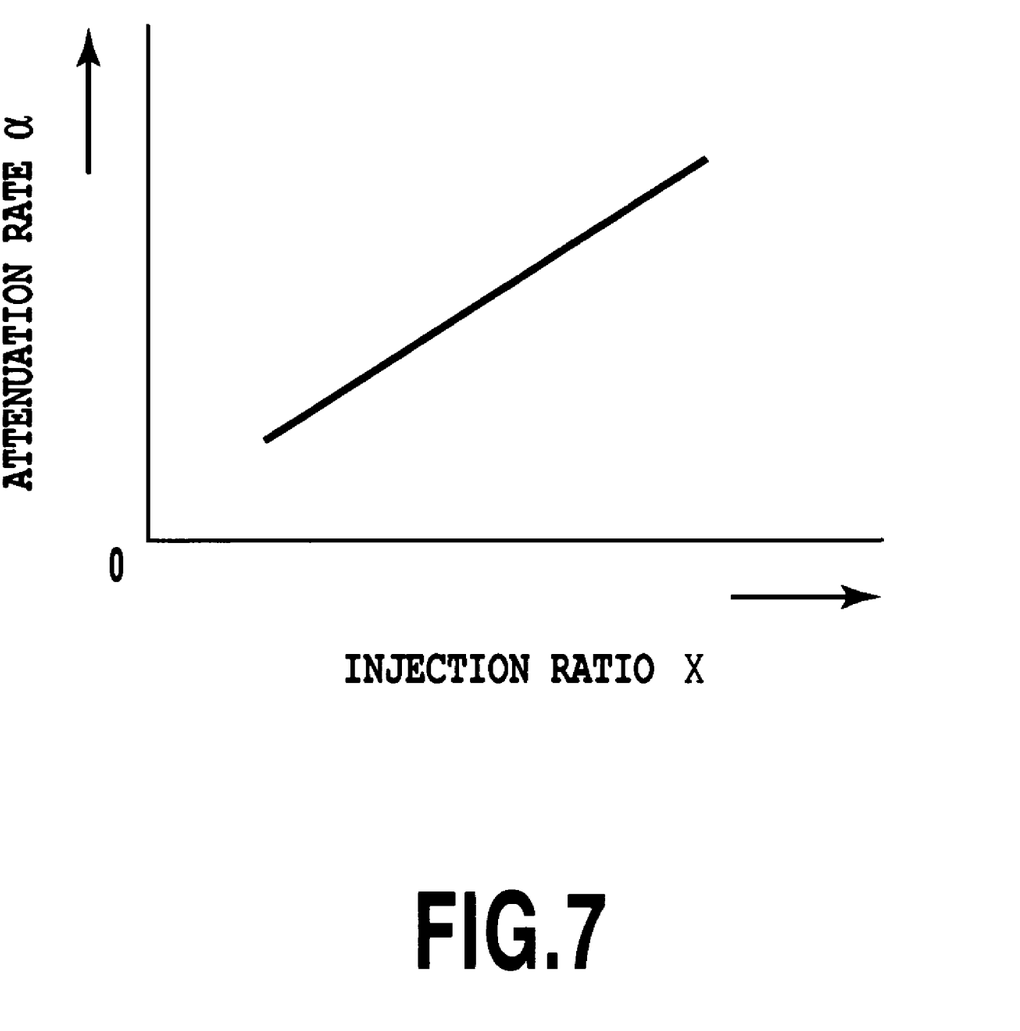
FIG. 7 is a graph showing an example of a relationship between an injection ratio and an attenuation rate in an embodiment of the present invention.

Specifically, since steps S401 to S404 in the flow chart of FIG. 4 are the same as the steps S201 to S204 in the flow chart of FIG. 2, the description thereof is used to avoid redundant description. Specifically, at step S404, the initial value "eatrnre" of the transitional ignition retard correction amount "ATRN" is determined from map values based on the injection ratio determined at step S402 and the rotation speed of the engine or calculated through computation. When it is determined that the engine is no longer in the abovementioned accelerating state in the determination at step S403, the routine proceeds to step S405, wherein an attenuation rate α, that is, an attenuation amount per unit time based on the injection ratio determined at step S402 and the rotation speed of the engine is determined. As an example shown in FIG. 7, the attenuation rate a is set to be larger as the injection ratio X from the injector 11 for in-cylinder injection is larger. This is because, when the injection ratio X from the injector 11 for in-cylinder injection is large, the amount of fuel supplied directly into the combustion chamber is increased to remove latent heat of vaporization. Thus, the cylinder cooling effect is improved and the resistance to knocking is enhanced, so that the transitional retard control can be finished in a shorter time period.

At the next step S406, attenuation processing is performed on the initial value "eatrnre" of the transitional ignition retard correction amount "ATRN" determined at step S404. In the present embodiment, the attenuation processing is performed by adding a predetermined attenuation amount "eatrnadd" (a positive value represented by a crank angle) in association with the attenuation rate a determined at step S404 to the initial value "eatrnre" for each cycle of the control routine. Accordingly, after a predetermined control routine cycle, in other words, after the lapse of a predetermined time period depending on the attenuation rate α, the transitional ignition retard correction amount "ATRN" is equal to zero. It should be noted that while the initial value "eatrnre" can be changed in association with the injection ratio X in the abovementioned description, this may be a fixed value. The attenuation processing in step S406 is guarded to avoid the resultant value equal to or lower than zero similarly to the previous embodiment.

Figure 9:
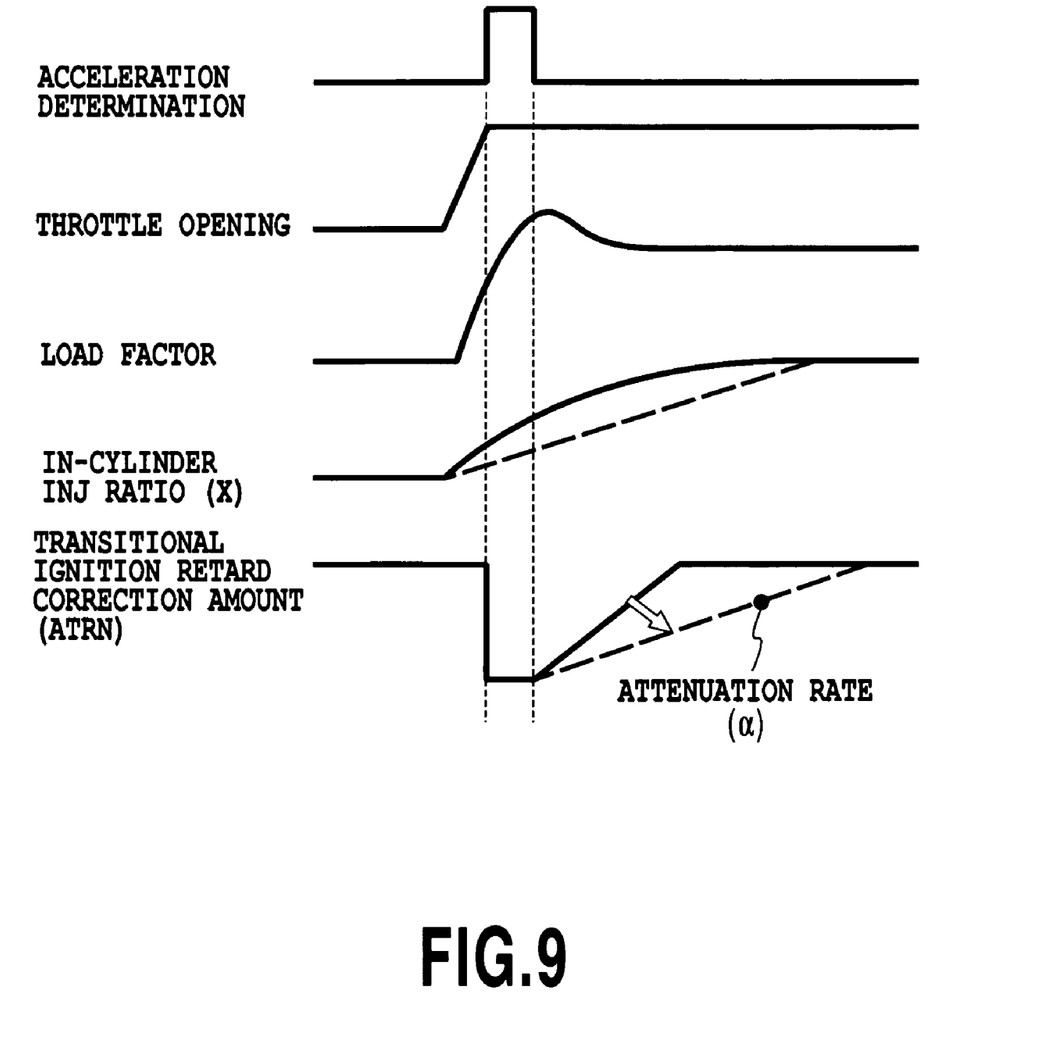
FIG. 9 is a time chart showing states of transitional retard control in Embodiment 2 of the present invention.

For easier understanding, state of control in Embodiment 2 described above is shown in a time chart of FIG. 9. In the time chart, changing states in the attenuation rate a are represented in different manners with a solid line and a broken line in association with the injection ratio X (represented as in-cylinder INJ ratio in FIG. 9) from the injector 11 for in-cylinder injection.

Figure 5:
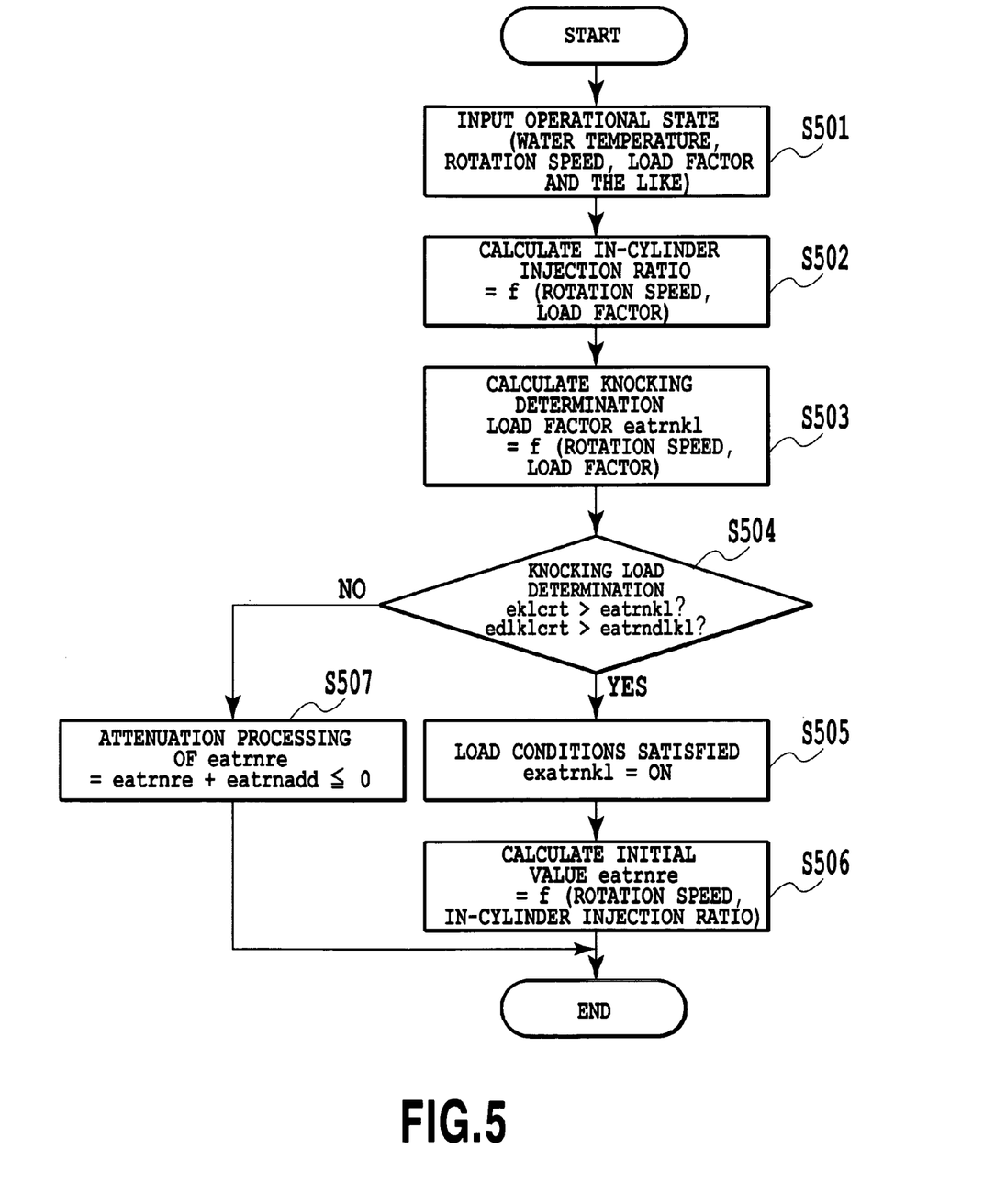
FIG. 5 is a flow chart showing an example of a transitional retard control routine in Embodiment 3 of the present invention.

Next, description will hereinafter be made of control in Embodiment 3 of the ignition timing controller of the dual injection type internal combustion engine according to the present invention having the abovementioned structure with reference to a flow chart shown in FIG. 5 which illustrates an example of a control routine. The control routine is also performed for each predetermined crank angle, for example, 180 degrees (in the case of a four-cylinder engine). In the routine, at step S501, the cooling water temperature, the engine speed, the load factor and the like which are the various operational parameters of the engine are acquired. The routine proceeds to step S502, wherein the fuel injection amounts and the corresponding in-cylinder injection ratio X from map values stored in the ROM-based on the engine speed and the load factor are calculated.

Next, at step S503, a knocking determination load factor "eatrnkl" serving as a criterion to determine whether transitional retard control is performed or not is calculated on the basis of the in-cylinder injection ratio X determined at the abovementioned step S502 and the engine speed. Then, at step S504, it is determined whether or not a load factor "eklcrt" determined by the opening of the throttle valve 7 is higher than the knocking determination load factor determined at the abovementioned step S503, and whether or not a change amount in the load factor "edlklcrt" is larger than a predetermined value "eatrndlkl." When one of them is smaller and both of them do not satisfy the conditions, it is determined that the engine is not in a state in which knocking easily occurs but the load conditions are not satisfied, and the routine proceeds to step S507. Transitional retard control is not performed except that the initial value is set in the previous routine cycle to perform the attenuation processing similarly to the abovementioned embodiments. On the other hand, when the load factor "eklcrt" is larger than the knocking determination load factor "eatrnkl" and the change amount in the load factor "edlklcrt" is larger than the predetermined value "eatrndlkl," that is, "Yes" in the determination, the routine proceeds to step S505, wherein a load condition satisfying flag is set on, and the routine proceeds to step S506.

Then, at step S506, the initial value "eatrnre" (a negative value represented by a crank angle) of the transitional ignition retard correction amount "ATRN" is determined from the map values based on the injection ratio determined at step S502 and the engine speed or calculated through computation. At step S507, the attenuation processing is performed on the initial value "eatrnre" of the transitional ignition retard correction amount "ATRN" in the same manner as in Embodiments 1 and 2 described above. Accordingly, redundant description is not made.

Figure 10:
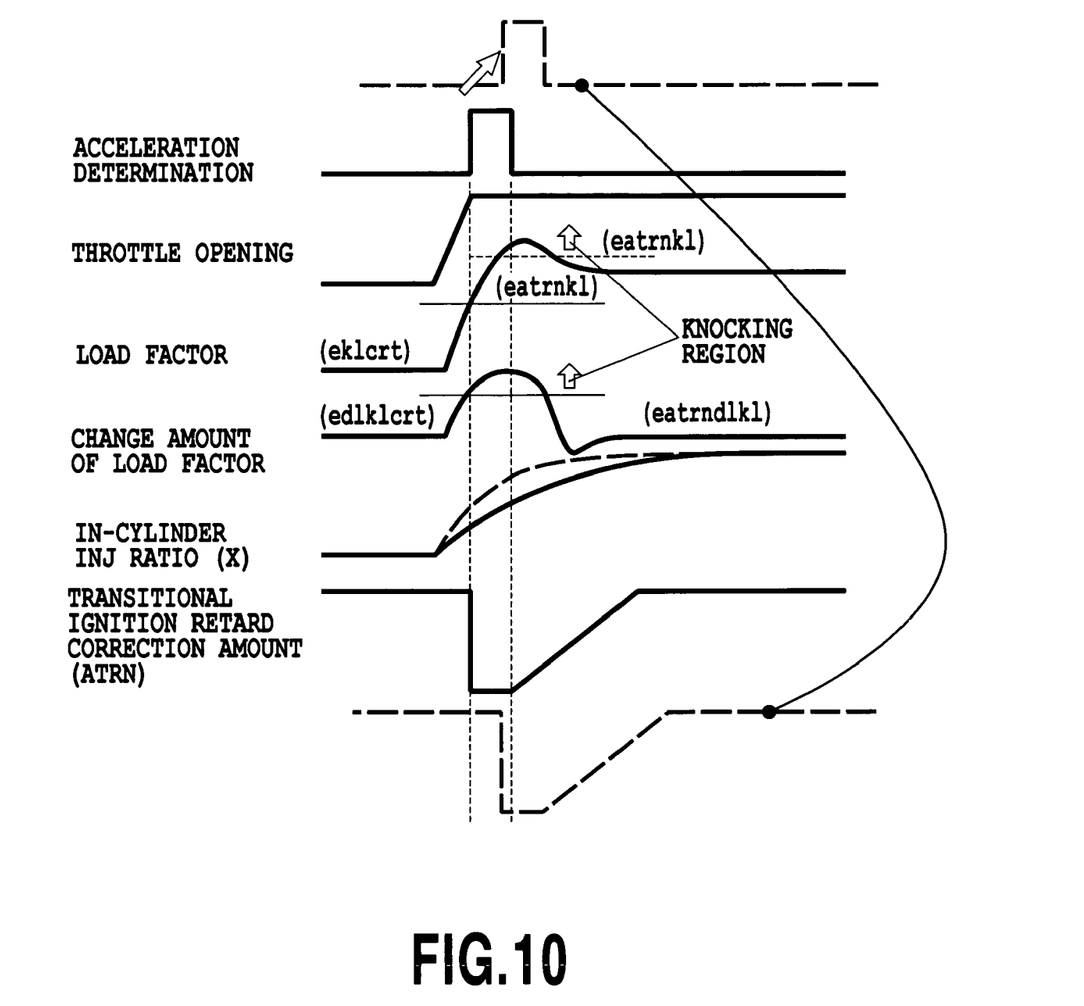
FIG. 10 is a time chart showing states of transitional retard control in Embodiment 3 of the present invention.

For easier understanding, states of control in Embodiment 3 described above are shown in a time chart of FIG. 10. In the time chart, the knocking determination load factor "eatrnkl" for defining the conditions to perform retard correction control of ignition timing with a transitional retard control means is represented in different manners with a solid line and a broken line, and in association therewith, acceleration determination and transitional ignition retard correction amounts are represented in different periods with solid lines and broken lines.

The abovementioned embodiments have been described with the example in which the retard control in transition is performed in association with the in-cylinder injection ratio X serving as a factor which affects the likeliness of occurrence of transitional knocking. However, control may be performed in combination with other factors, for example, the cooling water temperature, the intake air temperature and the like. In addition, it is possible to make a different determination of the conditions to start transitional retard control depending on after cold start or at warm start, that is, at restart.

The invention claimed is:

1. An ignition timing controller of an internal combustion engine equipped with an injector for in-cylinder injection and an injector for intake passage injection, comprising:
   transitional retard control means for correcting ignition timing for retard to prevent knocking during transitional operation of the engine,
   wherein a control amount by said transitional retard control means depends on a ratio of an amount of fuel injection from the injector for in-cylinder injection to an amount of fuel injection from the injector for intake passage injection.

2. The ignition timing controller of the internal combustion engine according to claim 1, wherein the control amount by said transitional retard control means is an initial value of a retard correction amount.

3. The ignition timing controller of the internal combustion engine according to claim 1, wherein the control amount by said transitional retard control means is an attenuation rate of a retard correction amount.

4. An ignition timing controller of an internal combustion engine equipped with an injector for in-cylinder injection and an injector for intake passage injection, comprising:
   transitional retard control means for correcting ignition timing for retard to prevent knocking during transitional operation of the engine,
   wherein a condition for performing control by said transitional retard control means depends on a ratio of an amount of fuel injection from the injector for in-cylinder injection to an amount of fuel injection from the injector for intake passage injection.

* * * * *